INVENTOR.
VIRGIL F. STEWART
BY Richey & Watts
ATTORNEYS

May 5, 1953 V. F. STEWART 2,637,219
FLUID CONTROLLED TRANSMISSION
Filed Aug. 25, 1950 3 Sheets-Sheet 3

INVENTOR.
VIRGIL F. STEWART
BY Richey + Watts
ATTORNEYS

Patented May 5, 1953

2,637,219

UNITED STATES PATENT OFFICE 2,637,219

FLUID CONTROLLED TRANSMISSION

Virgil F. Stewart, East Cleveland, Ohio

Application August 25, 1950, Serial No. 181,416

5 Claims. (Cl. 74—688)

This invention relates to a variable speed transmission controlled by a fluid coupling. It is particularly adapted for the transmission of power in the engines of automotive vehicles such as passenger cars, trucks, and busses. However, the invention may be employed in various environments where rotative energy is to be transmitted from a prime mover to a driven device wherein variable loads are encountered. A transmission similar to the present type is disclosed in my co-pending application, Serial No. 70,321, filed January 11, 1949, now Patent No. 2,543,878, issued March 6, 1951, the present application covering improvements made thereto.

The primary object of this invention is to provide a variable transmission speed ratio and to achieve such ratio change automatically and without gear shifting.

Another object of the invention is to provide a power transmission mechanism which involves the principle of diminishing ratio and increasing ratio through the use of a fluid coupling and fixed gearing in constant mesh, the ratio diminishing or increasing in direct relation to the applied load.

A further object of the invention is to provide a compact automatic transmission capable of easy manufacture and assembly which is particularly well suited to the requirements of vehicles driven by internal combustion engines.

Other objects and advantages of the invention, more or less ancillary in nature will be apparent to those skilled in the art from the appended description of the preferred embodiment of the invention and accompanying drawings, in which.

Figure 1:
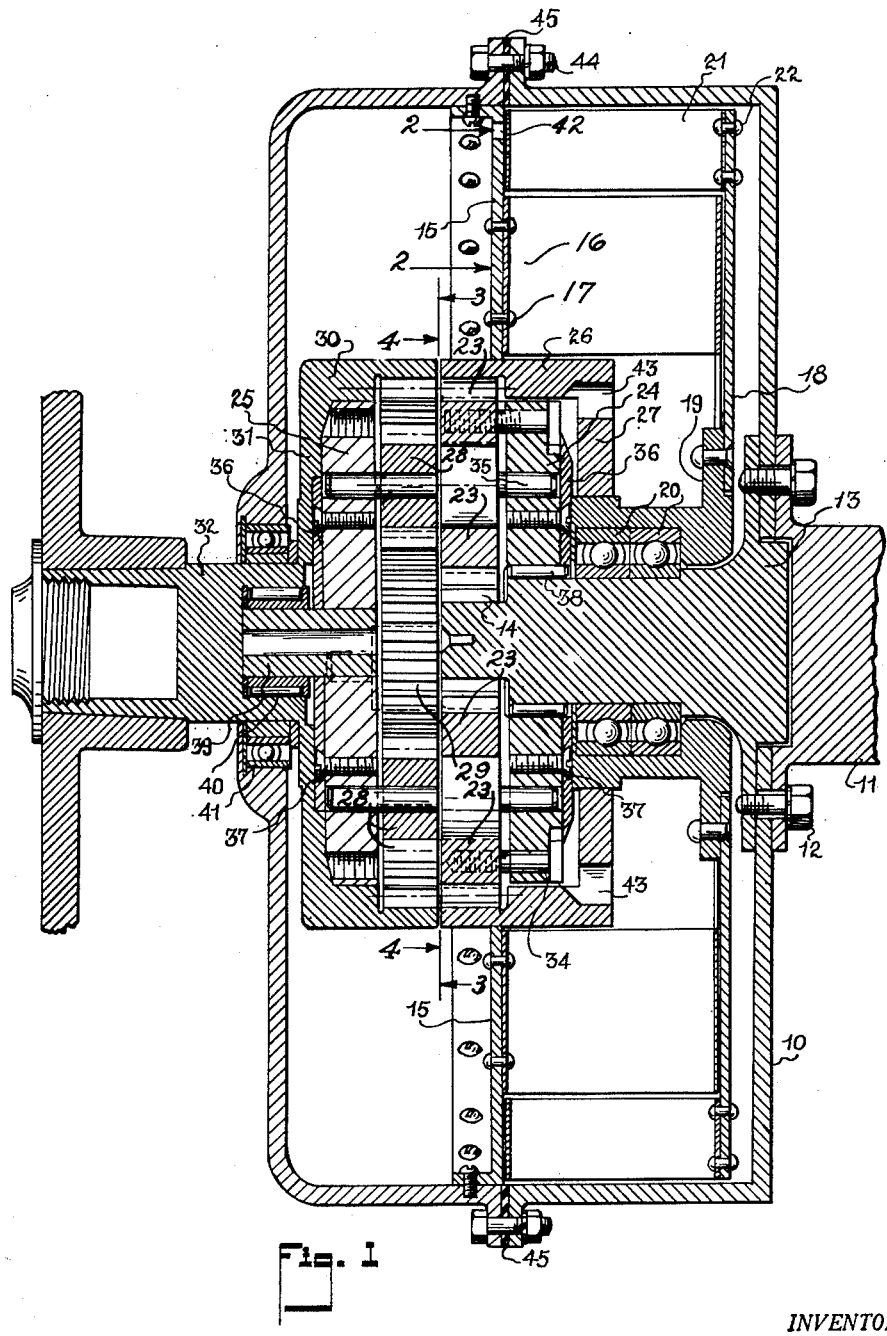
Fig. 1 is a longitudinal cross section of the transmission assembly.

The preferred embodiment of the invention includes an oil-tight circular case 10 which circumscribes and encloses the operable parts of the transmission. A power input shaft 11 is joined to the case 10 by a plurality of cap screws 12 which maintain the centerline of shaft 11 in coincidence with the center of rotation of the case 10; thus the rotative speed of case 10 is equal to the speed of the input shaft and the output of the prime mover. A stub shaft 13 projects inwardly along the centerline of case 10 and is joined thereto by the cap screws 12. The stub shaft 13 has a pinion 14 formed thereon at the innermost end thereof.

Figure 2:
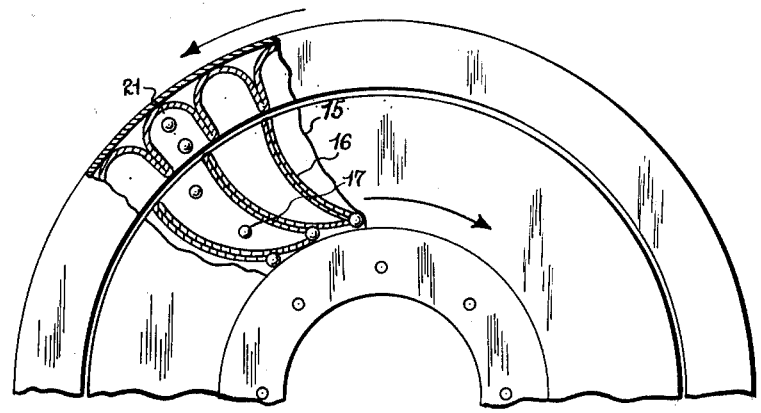
Fig. 2 is an elevational view of the fluid coupling having parts thereof cut away.
Figure 3:
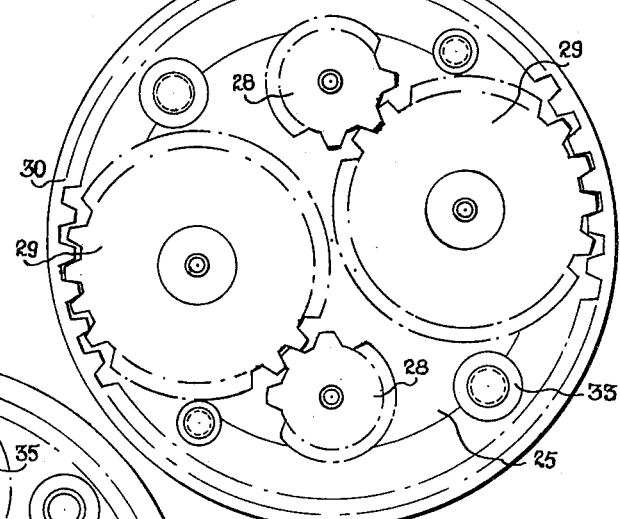
Fig. 3 is a sectional view of the transmission gearing taken along line 3—3 of Fig. 1.
Figure 4:
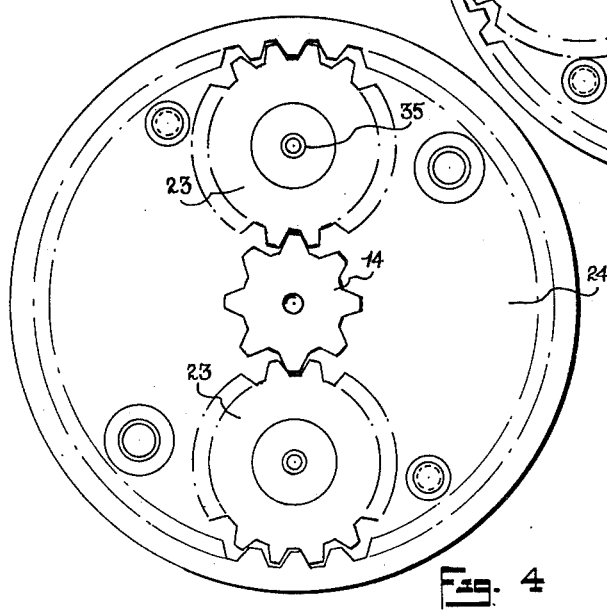
Fig. 4 is a cross sectional view of the transmission gearing taken along line 4—4 in Fig. 1.

The hydraulic coupling as illustrated in Fig. 1 and Fig. 2 includes a disc 15 projecting radially inwardly from the inner wall of case 10 which is affixed thereto. A plurality of fins 16 joined to disc 15 by a number of rivets 17 or other suitable fabricating means are curved radially inward so that the forward face of the blade is convex when viewed from a point in advance of the blade as it rotates.

The driven rotor includes a disc 18 which is joined to a flanged hub 19. A pair of antifriction bearings 20 lie intermediate hub 19 and shaft 13 and carries the hub 19 for relative rotation with the shaft 13. A plurality of pockets 21, preferably formed from a continuous strip of thin metal, project laterally from disc 18 and are joined thereto by a plurality of rivets 22. The pockets 21 and fins 16 have clearance space therebetween to allow relative rotation. The coupling action, therefore, is accomplished by the fluid being discharged from the fin section against the pockets which are caused to move as a result of the force applied thereto by the moving fluid. It follows that as casing 10 and fins 16 are rotated by the input shaft 11, the oil will be pumped through the coupling and the driven rotor will be rotated at a speed approaching that of the casing.

The transmission gearing is of the planetary type wherein pinion 14 on the end of drive shaft 13 functions as the sun gear. A pair of planet gears 23 engage sun gear 14 and are carried for rotation around said gear by two spider discs 24 and 25. A ring gear 26 circumscribes the gears 23 and is in engagement therewith. A radial flange 27 on ring gear 26 is affixed to the hub 19 of the driven rotor. It is seen, therefore, that since ring gear 26 rotates with the driven rotor and sun gear 14 rotates with the casing and the fins 16, relative motion in the coupling occurs only when the planetary gears are rotating relative to sun gear 14. Further, the relative velocity between the driving and driven rotors is directly proportional to the relative velocity of the planetary gears, and the spider around sun pinion 14.

Each of the planetary gears 23 has a pinion 28 integral and coaxial therewith which drives the second planetary gear 29 carried for rotation by spider plates 24 and 25. The gears 29 are relatively large as compared to pinions 28 thereby producing a gear reduction relative to gears 23. The ring gear 30 circumscribes and engages gears 29 and has a radial flange 31 integral with the output shaft and flange 32. The ring gear 30, therefore, rotates at the same speed as the input shaft 11 when there is no relative rotation in the planetary gears. However, due to the above mentioned gear ratio between pinion 28 and gear 29, the speed of ring gear 30 will be reduced relative to ring gear 26 when planetary gears 23 and the spider rotate relative to sun gear 14.

The spider plates 24 and 25 are held in spaced relationship by spacers 33 which have one end thereof in threaded engagement with plate 25. Cap screws 34 hold plate 24 against the opposite end of spacers 33 and are threadably mounted therein. The spider plates are bored to receive trunnions 35 on the planetary gears and thereby hold the gears for rotation on an axis parallel to the axis of rotation of case 10 and in the proper spaced relationship to sun gear 14 and ring gears 26 and 30. Bearing plates 36 are mounted on the sides of the spider plates 24 and 25 opposite to the planetary gears and absorb the thrust of the planetary gears as they rotate in the spider. Plates 36 are held in abutting relationship to spider plates 24 and 25 by a series of screws 37.

The spider is free to rotate in either direction relative to the case and is carried for such rotation by needle-type bearings 38 located between spider plate 24 and shaft 13. A stub shaft 39 is joined to spider plate 25 and projects laterally therefrom along the centerline thereof. Needle bearings 40 carry the shaft 39 for rotation within a counterbored portion of the output shaft 32. An antifriction bearing 41 is disposed to carry the end of case 10 opposite to input shaft 11 and is located between the inner margin of the radial flange on case 10 and shaft 32.

The oil circuit through the fluid coupling is completed through a plurality of ports 42 in disc 15 near the wall of casing 10 and through a number of openings 43 in the flange 27 of ring gear 26. A substantially circular path results from the coupling arrangement and the aforementioned ports and prevents the loading up of the fluid in the coupler elements.

Casing 10 is formed in two sections for assembly purposes, the sections being joined at their flanges by a row of bolts 44. A gasket 45 intermediate of the casing flanges prevents leakage of fluid from the interior of the coupling assembly.

In normal operation, the casing 10 and stub shaft 13 will be rotated as the engine drives the transmission. For purposes of this specification, the normal operating condition will be considered as the low torque or no load condition during which no relative movement occurs between the driving and driven rotors and the planetary gears are stationary relative to the sun gear. The speed of rotation of the output shaft will be equal to that of the input shaft and the entire assembly will rotate as a unit.

If the rotation of output shaft 32 is resisted requiring a torque to overcome such resistance, this torque will be immediately transmitted through ring gear 30 to planetary gear 29, pinion 28 and planetary gear 23. Sun gear 14 being affixed to shaft 11 will be driven by the input torque and will oppose the rotation of gear 23 and thereby cause relative rotation therebetween. When this occurs, spider 24 will revolve and ring gear 26 will be made to rotate in a direction opposite to that of the input shaft. Assuming no resistance to the rotation of ring gear 26, it can be seen that the planetary system would be incapable of transmitting torque from the input to the output shafts. It is obvious therefore that a flexible locking effect must be introduced to overcome the rotation of ring gear 26 and to cause the input torque to be transmitted through the assembly.

Figure 5:
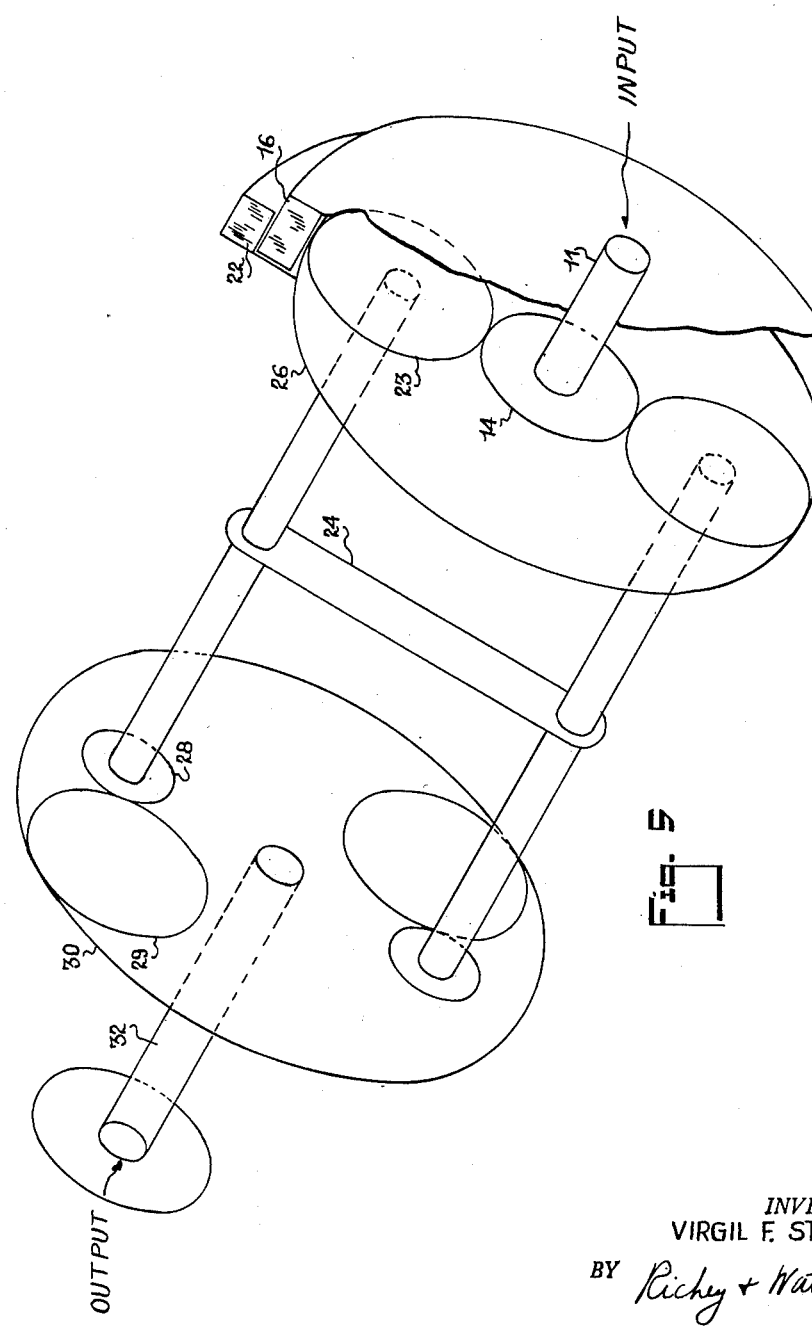
Fig. 5 is an isometric schematic representation of the gear train and the related fluid coupling.

Reference to Fig. 5, a schematic diagram of the gear train assembly, will show how the fluid coupling is incorporated to provide the necessary locking. Pump vanes 15 are affixed to the input shaft and discharge to the driven rotor pockets 21 which are attached to ring gear 26. Therefore, relative movement of ring gear 26 in an opposite direction to the input shaft and driving rotor 15 will be overcome by the coupling effect of the fluid between vanes 15 and pockets 21. The amount of coupling required will be that necessary to overcome the reaction caused by applying load to the output shaft.

Obviously, the force delivered to the driven baffle member by the oil projected against it will be determined very largely by the realtive speed of the two rotors. When the speed of the two members is the same, there will be no driving force, but as the load is imposed upon the driven member, it will begin to rotate relative to the driving member and the torque developed thereby will tend to carry the load. The planetary gear system used in this device will cause rotation of the spider member 24 at a speed which is proportional to the difference in the speeds of the input shaft 32. The spider rotation causes the ring gear 26 to turn at a speed which is also proportional to the difference in speeds of the rotation of the input shaft and the output shaft. It follows therefore that the relative velocities of the fluid coupling elements and the torque provided thereby is determined by the relative rotation of the driving member and the driven member. As the speeds of these two members approach unity, the locking force or torque supplied by the coupling diminishes.

It may be noted that the normal friction forces will add to the above mentioned locking effect of the coupling and serve to prevent relative rotation of the gearing in the planetary system when the output torque requirement is low. Under this condition, there would be no loss in either the gearing or the coupling. The normal cruising power required for a vehicle is in this range and therefore, the ordinary inefficiencies are absent during the operation of this device under normal conditions.

In starting the vehicle, the output shaft may be considered an essentially locked whereupon the power to the input shaft will cause rotation at an ever increasing speed until sufficient force is obtained from the transmission to cause rotation in the output shaft. During the interval of increasing the torque, ring gear 30 is stationary. Planetary gear 29 being driven by the pinion 28, gear 23, and sun gear 14 will rotate and travel around ring gear 30 thus producing a rotation in the spider. The ring gear 26 will be rotated as a result of this motion in the spider, thus producing relative velocities between the driving and driven rotors in the fluid coupling. As this coupling effect increases with the speed change in the gearing, the locking torque will increase therewith to a point where it is sufficient to resist a further increase in the motion of the spider whereupon ring gear 30 will cause rotation of the output shaft.

The effect of the planetary gear system is that of changing the gear ratio so that the input torque may develop a much higher output torque. As the speed of the vehicle increases, and the output torque decreases, the gearing assembly with the action of the fluid coupling will gradually and automatically change gear ratio as required by the output load until it reaches unity at the low torque condition. The gear ratio and the coupling may be selected to match the characteristics of the particular prime mover and load with which it is used. If the gear ratio is too high, the engine may not reach a sufficient speed to develop the necessary torque which will produce a suitable acceleration in the vehicle.

The braking effect of the engine is desirable in the operation of a vehicle, particularly when travelling down grades. This effect is present in and is transmitted through this type of transmission by the action of ring gear 30 and gear 29 in rotating the spider opposite to the normal direction. Again, the ratio of the transmission changes and relative velocities occur between the driving and driven rotors, thus producing a torque and a locking effect on the transmission. The braking effect increases as the difference between the rotative speeds of the input and the output shafts becomes greater, although the locking effect of the coupling will not be as strong when the action is reversed due to the inefficiencies of the circulation caused by the blade shapes.

From the foregoing, it will be seen that the basic function of the planetary gear system is to vary the speed difference between the input and output members, and thereby increase the torque as required by the load to give the desired performance with the given prime mover. Such multiplication of torque is accomplished over a wide range without shifting of gears. Further, an infinite variation of gear ratios occurs smoothly and automatically as required by the load imposed on the transmission.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A power transmission device comprising a hydraulic coupling including two elements relatively rotatable about a common axis and having a mutual torque reaction; a power input shaft and a power output shaft concentric with the said axis, one of the elements being directly coupled to one of the said shafts; and gearing means coupled to both of the said shafts and the other element, said means comprising a sun gear on said one shaft, a spider mounted for rotation on said axis, a gear assembly carried by said spider, a ring gear affixed to the other element, and a second gear mounted on the output shaft, said assembly operably joining the sun gear and said ring gear and second gear.

2. A power transmission device comprising a hydraulic coupling including two elements relatively rotatable about a common axis and having a mutual torque reaction; a power input shaft and a power output shaft concentric with the said axis, one of the elements being directly coupled to one of the said shafts; and gearing means coupled to both of the said shafts and the other elements; said means comprising a sun gear on said one shaft, a spider mounted for rotation on said axis, planetary gears carried by said spider in engagement with the sun gear, a ring gear affixed to the other element and in operable engagement with said planetary gears, and a second ring gear mounted on the output shaft and operably joined with the planetary gears whereby the speed ratio between the input and output shafts is a function of the difference in speed between the two elements.

3. A power transmission device comprising a hydraulic coupling including two elements relatively rotatable about a common axis and having a mutual torque reaction; a power input shaft and a power output shaft concentric with the said axis, one of the elements being directly coupled to one of the said shafts, the other element being operably coupled to the other shaft, and means including a sun gear on said one shaft, a spider mounted for rotation on said axis, a pair of gears carried by said spider joined for rotation as a unit on a common axis, one of said pair of gears being in engagement with said sun gear, an idler gear mounted for rotation on the spider, said idler gear engaging the other of said pair of gears, and a ring gear mounted on the output shaft for engagement with said idler gear.

4. A power transmission device comprising a hydraulic coupling including two elements relatively rotatable about a common axis and having a torque reaction; a power input shaft and a power output shaft concentric with the said axis, one of the elements being directly coupled to one of said shafts, the other element being operably coupled to the other shaft, and means including a sun gear on said one shaft, a spider mounted for rotation on said axis, a pair of gears carried by said spider joined for rotation as a unit on a common axis, one of said gears being in engagement with said sun gear, an idler gear mounted for rotation on the spider, said idler gear engaging the other of said pair of gears, and a ring gear mounted on the output shaft for engagement with said idler gear, said one gear of the pair of gears being relatively larger than the other of said pair of gears.

5. A power transmission device comprising a hydraulic coupling including two elements relatively rotatable about a common axis and having a mutual torque reaction; a power input shaft and a power output shaft concentric with the said axis, one of the elements being directly coupled to one of the said shafts, the other element being joined to a ring gear, and means including a sun gear on said one shaft, a spider mounted for rotation on said axis, a pair of gears carried by said spider joined for rotation as a unit on a common axis, one of said pair of gears being in engagement with said sun gear and said ring gear, an idler gear mounted for rotation on the spider, said idler gear engaging the other of said gears, and a second ring gear mounted on the output shaft for engagement with said idler gear, said one gear of the pair of gears being relatively larger than the other of said pair of gears, said idler gear being relatively larger than the other of said gears whereby said first ring gear rotates at a higher speed than said second ring gear as the spider rotates relative to the input shaft.

VIRGIL F. STEWART.

References Cited in the file of this patent

UNITED STATES PATENTS

| Number | Name | Date |
|---|---|---|
| 1,949,816 | Smith-Clarke | Mar. 6, 1934 |
| 2,311,150 | Buraczynski | Feb. 16, 1943 |
| 2,314,253 | Stewart | Mar. 16, 1943 |
| 2,448,249 | Bonham | Aug. 31, 1948 |
| 2,523,619 | Grebb | Sept. 26, 1950 |
| 2,543,878 | Stewart | Mar. 6, 1951 |

FOREIGN PATENTS

| Number | Country | Date |
|---|---|---|
| 442,562 | Great Britain | Feb. 11, 1936 |
| 450,953 | Great Britain | Apr. 24, 1935 |